United States Patent
Rahman (10) Patent No.: US 8,584,181 B2
(45) Date of Patent: Nov. 12, 2013

(54) MULTIMEDIA CHANNEL SHARING ACROSS ACCESS NETWORK BOUNDARIES

(75) Inventor: Moshiur Rahman, Marlboro, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 0 days.

(21) Appl. No.: 13/536,229

(22) Filed: Jun. 28, 2012

(65) Prior Publication Data

US 2012/0272277 A1   Oct. 25, 2012

Related U.S. Application Data

(63) Continuation of application No. 12/188,317, filed on Aug. 8, 2008, now Pat. No. 8,239,898.

(51) Int. Cl.
 *H04N 7/173* (2011.01)
(52) U.S. Cl.
 USPC ................................ 725/87; 725/98; 725/100
(58) Field of Classification Search
 USPC .............................................. 725/87, 98, 100
 See application file for complete search history.

(56) References Cited

U.S. PATENT DOCUMENTS

| | | |
|---|---|---|
| 5,461,415 A | 10/1995 | Wolf et al. |
| 5,712,906 A | 1/1998 | Grady et al. |
| 6,049,823 A | 4/2000 | Hwang |
| 2004/0117306 A1 | 6/2004 | Karaoguz |
| 2005/0177853 A1 | 8/2005 | Williams |
| 2006/0195902 A1 | 8/2006 | King |
| 2007/0094691 A1 | 4/2007 | Gazdzinski |
| 2007/0266122 A1 | 11/2007 | Einarsson et al. |
| 2008/0060038 A1 | 3/2008 | Stallings |
| 2009/0113472 A1 | 4/2009 | Sheth |
| 2009/0144786 A1 | 6/2009 | Branam et al. |
| 2009/0183213 A1 | 7/2009 | Mukerji et al. |

*Primary Examiner* — Kieu Oanh T Bui
(74) *Attorney, Agent, or Firm* — Guntin & Gust, PLC; Douglas Schnabel (57) ABSTRACT

An initiating viewer identifies a multimedia channel and submits a request to share the multimedia channel with at least one recipient viewer at another viewer premises. This request is processed by the multimedia receiver of the initiating viewer so as to generate a channel change request for submission to a service provider. In response to the channel share request, the service provider queries the recipient viewer to determine whether the recipient viewer accepts or rejects the offered multimedia channel. If the recipient viewer accepts the multimedia channel, the multimedia channel can be provided to the multimedia receiver of the recipient viewer either for storage for later playback or for immediate playback concurrent with the provision of the multimedia channel to the initiating viewer. Billing for costs associated with the shared multimedia channel is conducted based on billing feedback provided by the initiating viewer.

20 Claims, 9 Drawing Sheets

MULTIMEDIA CHANNEL SHARING ACROSS ACCESS NETWORK BOUNDARIES

CROSS-REFERENCE TO RELATED APPLICATION

The present application is a continuation of U.S. patent application Ser. No. 12/188,317, filed Aug. 8, 2008, and is related to a co-pending, U.S. patent application Ser. No. 12/188,316, entitled, "MULTIMEDIA CHANNEL SHARING," having common inventorship and filed on Aug. 8, 2008, the entirety of which is incorporated by reference herein.

FIELD OF THE DISCLOSURE

The present disclosure generally relates to the provision of multimedia content, and relates more particularly to the provision of multimedia content via a network.

BACKGROUND

Cable and satellite television providers typically provide a wide variety of multimedia channels to viewers. However, due to a variety of factors, each viewer does not have conventional access to the same set of multimedia channels as every other viewer. Many service providers have different tiers or packages of multimedia services, with some multimedia channels being available to only those viewers who subscribe to a particular channel package. Moreover, special events, such as sporting contests, first-run movies, and the like, often are provided "on-demand," either through an on-demand listing from the service provider or via a "pay-per-view" service. Such multimedia channels typically are provided only to those viewers who expressly sought out the "on-demand" or pay-per-view channel.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

FIGS. 1-9 illustrate example techniques for sharing multimedia channels among viewers at different viewer premises (e.g., different households). In one embodiment, an initiating viewer identifies a multimedia channel and submits a request to share the multimedia channel with at least one recipient viewer at another viewer premises. This request is processed by the multimedia receiver of the initiating viewer so as to generate a channel change request for submission to a service provider. As part of this process, the multimedia receiver can obtain cost information for the sharing of the selected multimedia channel and display this cost information to the initiating viewer. The initiating viewer then can chose either the initiating viewer or the recipient viewer as responsible for paying the costs of sharing the multimedia channel. In response to the channel share request, the service provider contacts the recipient viewer via the multimedia receiver associated with the recipient viewer and queries whether the recipient viewer would like to accept or reject the offered multimedia channel. If the recipient viewer accepts the multimedia channel, the multimedia channel can be provided to the multimedia receiver of the recipient viewer either for storage for later playback or for immediate playback concurrent with the provision of the multimedia channel to the initiating viewer. If the recipient viewer rejects the multimedia channel or sharing of the multimedia channel is not enabled, the service provider notifies the initiating viewer. Billing for any costs associated with the shared multimedia channel is conducted in accordance with billing feedback provided by the initiating viewer (and based on acceptance of the multimedia channel by the second viewer). In one at least one embodiment, the viewer input is facilitated via graphical user interfaces (GUIs) at the multimedia receivers. The GUIs can be implemented as, for example, electronic programming guides (EPG) or other on-screen displays (OSDs) provided by the multimedia receivers. Further, in at least one embodiment, the initiating viewer and the recipient viewer are on different access networks, and the service provider is configured to enable inter-network sharing by establishing a multimedia communications session with the recipient viewer across network boundaries using, for example, Session Initiation Protocol (SIP)-based signaling or other inter-network session signaling protocols.

The term "multimedia" refers to video content, audio content, or a combination thereof. Accordingly, the term "multimedia channel" refers to a stream of video content, a stream of audio content, or a combination thereof. The term "presentation" refers to the display of video content in a video context, the audible output of audio content in an audio context, or a combination thereof. Accordingly, the presentation of a multimedia channel includes one or both of a display of at least a portion of the stream of video content of the multimedia channel and the audible output of at least a portion of the stream of audio content of the multimedia channel. In the context of the output of audio content, either alone or in combination with the display of video content, a viewer is understood to be a listener.

In the context of a relatively fixed multimedia receiver, viewer premises can include, for example, a residence or place of work of the viewer, a car, a boat, a plane or other vehicle, and the like. In the context of a portable multimedia receiver, such as a multimedia-enabled cellular phone, viewer premises can include a viewer's personal space while operating the multimedia receiver.

For ease of illustration, certain techniques disclosed herein are described in an example context of an Internet Protocol Television (IPTV) network utilizing a set top box (STB) device or other multimedia receiver to interface between a display device, such as a television or computer, and the multimedia content distribution network of a service provider. However, these techniques also can be implemented in other contexts without departing from the scope of the present disclosure.

Figure 1:
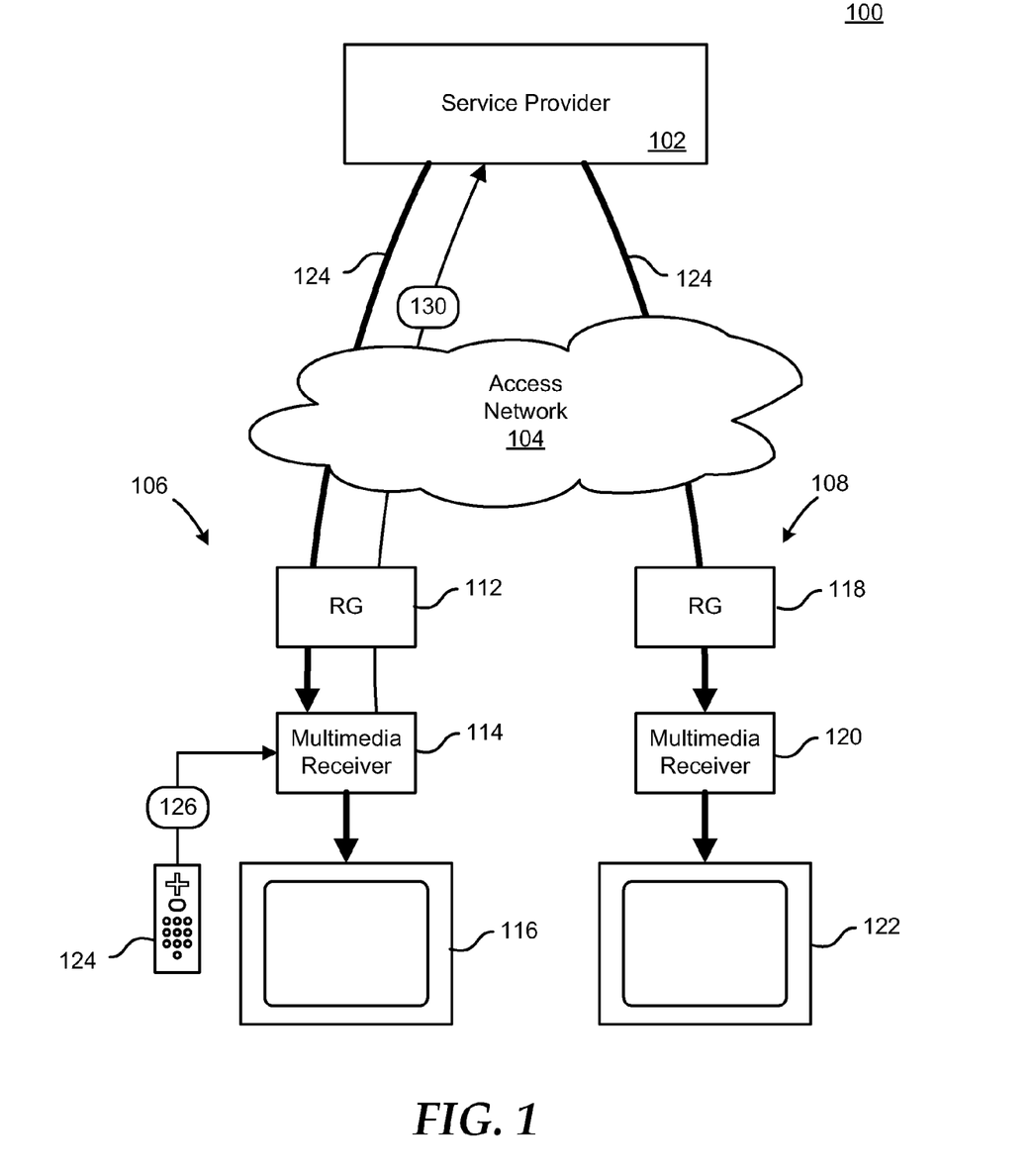
FIG. 1 is a diagram illustrating an example multimedia content distribution system in accordance with at least one embodiment of the present disclosure.
Figure 2:
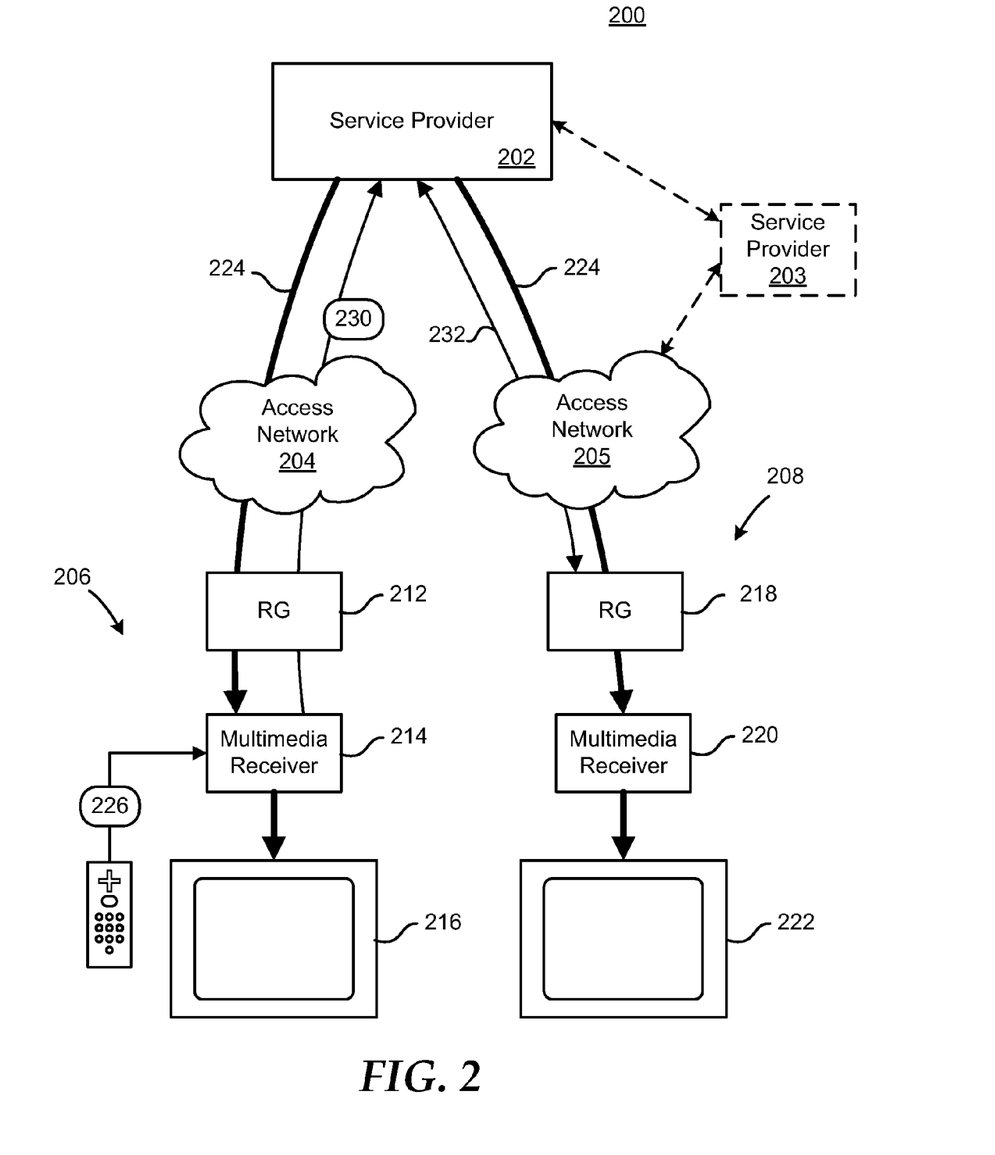
FIG. 2 is a diagram illustrating another example multimedia content distribution system in accordance with at least one embodiment of the present disclosure.

FIGS. 1 and 2 illustrate example multimedia content distribution systems that facilitate sharing of multimedia channels in accordance with at least one embodiment of the present disclosure. In the depicted example of FIG. 1, a multimedia content distribution system 100 includes a service provider 102, an access network 104, and viewer premises 106 and 108 connected to the service provider 102 via the access network 104. The service provider 102 can include, for example, a cable television provider, a satellite television provider, an Internet-based multimedia content provider, and the like. The viewer premises 106 include a residential gateway (RG) 112, a multimedia receiver 114, and a display device 116. Likewise, the viewer premises 108 include a residential gateway 118, a multimedia receiver 120, and a display device 122. The residential gateways 112 and 118 include network interfaces to the access network 104, such as, for example, a digital subscriber line (DSL) modem, a cable modem, a satellite receiver, and the like. The multimedia receivers 114 and 120 are configured to process multimedia data received from the service provider 102 via the access network 104 and can include, for example, an STB device, a digital network radio receiver, a portable multimedia device (such as a multimedia-enable cellular phone or a digital radio receiver), and the like. In at least one embodiment, the residential gateway and the multimedia receiver at a viewer premises are implemented together in a single device. The display devices 116 and 122 can include, for example, televisions, computer monitors, or the displays of portable multimedia device.

The access network 104 can include any of a variety of digital networks or a combination thereof. Examples of the access network 104 can include an Internet-Protocol (IP)-based network, such as the Internet, an Ethernet network, a wireless network (such as an IEEE 802.11a/b/g/n-compatible network), a satellite network, a Bluetooth™-based network, and the like. The transmission medium of the access network 104 for wire-based implementations can include, for example, a coaxial cable-based medium (such as a cable television medium), a DSL-based medium (such as a plain old telephone system (POTS) medium), a fiber-optic medium, and the like. In at least one embodiment, the access network 104 is a fully-private or quasi-private network operated by, or associated with, the service provider 102.

In operation, the service provider 102 provides multimedia content services to the viewer premises 106 and 108. These multimedia content services can include, for example, linear program broadcasting (such as the broadcast transmission of network television program content or cable television program content) and program multicasting (such as the multicast transmission of multimedia content in response to a specific viewer request, also commonly referred to as an "on demand" transmission). In many instances, the viewer at viewer premises 106 may desire to share a multimedia channel 124 with the viewer at viewer premises 108. For example, the viewer at viewer premises 106 may have ordered an "on demand" multimedia program (one embodiment of the multimedia channel 124) and then wishes to share the "on demand" multimedia program with a friend at viewer premises 108. As another example, the viewer at viewer premises 106 may be watching one multimedia program but may come across a listing for another multimedia program in an electronic programming guide (EPG) and identify the listed multimedia program (another embodiment of the multimedia channel 124) as being of potential interest to the viewer at viewer premises 108. Accordingly, in at least one embodiment, the viewer at the viewer premises 106 can provide viewer input 126 to the multimedia receiver 114 via, for example, a remote control device 128 or an input panel (not shown), to request sharing of an identified multimedia channel. In at least one embodiment, the viewer input 126 can include an identifier of the multimedia channel sought to be shared, an identifier for each of the one or more viewers with whom the multimedia channel is sought to be shared, and an indicator of who is to be billed for costs associated with sharing the multimedia channel, if applicable. The identifier of the multimedia channel can include, for example, a name or ID number of a multimedia program being transmitted on the multimedia channel or a channel number associated with the multimedia channel. The identifier of a recipient viewer can include a network address (such as an Internet Protocol (IP) address) associated with the residential gateway 118 or the multimedia receiver 120, a user identifier associated with the recipient viewer (such as a user name, a user account number, an email address, etc.), and the like. The indication of who is to be billed for any charges related to the shared channel can identify, for example, either the initiating viewer who requested the sharing of the multimedia channel or the recipient viewer who is intended to receive the shared multimedia channel.

The viewer at viewer premises 106 can initiate a request to share a particular multimedia channel by, for example, engaging a "share" button on the remote control 128, by engaging a "share" button on a viewer input panel of the multimedia receiver 114, or by selecting a "share" button or other selectable interface feature in a graphical user interface (GUI) provided by the multimedia receiver 114 for display at the display device 116. In response to determining the viewer has initiated the channel sharing process, the multimedia receiver 114, in one embodiment, is configured to use a dialog box or other GUI feature and a viewer input mechanism (such as the remote control device 128 or an input panel) to obtain information necessary to enact the channel sharing, including, but not limited to, the identifier of the multimedia channel to be shared, the identifier of each of the one or more recipient viewers, and the indicator of billing responsibility. The GUI can be implemented as part of an EPG or as a separate GUI.

The multimedia receiver 114, in response to the viewer input 126, is configured to generate a channel share request 130 based on the information of the viewer input 126, and further is configured to transmit the channel share request 130 to the service provider 102 via the residential gateway 112 and the access network 104. The service provider 102 extracts the relevant information from the channel share request 130 and determines whether sharing of the identified multimedia channel is enabled and, in particular, whether the identified recipient viewer is enabled to receive the identified multimedia channel. If sharing of the identified multimedia channel is enabled and the identified recipient viewer is permitted to receive the identified multimedia channel, the service provider 102 begins distributing the content of the multimedia channel 124 to the viewer premises 108 for processing at the multimedia receiver 120 of the viewer premises 108. The distribution of the multimedia channel 124 to the recipient viewer can occur concurrently with distribution of the multimedia channel 124 to the initiating viewer, or the multimedia channel 124 can be separately distributed to the recipient viewer while the initiating viewer receives a different multimedia channel.

In at least one embodiment, the service provider 102 queries the viewer at the viewer premises 108 prior to initiating sharing of the multimedia channel 124 to verity that the recipient viewer desired to view the multimedia channel 124. This query can include, for example, utilizing the multimedia receiver 120 to display a dialog box so that the recipient viewer can elect to reject the offered multimedia channel 124; accept the offered multimedia channel 124 to be stored for later playback; or the accept the offered multimedia channel 124 for immediate playback. The dialog box or other GUI feature also may provide the cost of the shared multimedia channel to the recipient viewer, if any, to be considered by the recipient viewer as a factor in deciding whether to accept or reject the offered multimedia channel 124.

Because the viewer premises 106 and 108 are connected to the service provider 102 via the same access network 104 serviced by the service provider 102, the service provider 102 can enact sharing of the multimedia channel 124 by, for example, associating the network address of the multimedia receiver 120 of the recipient viewer with the multicast group associated with the multimedia channel 124 using, for example, Internet Group Management Protocol (IGMP) signaling. Sharing of a multimedia channel within the same network is described in greater detail below with reference to FIG. 6. Further, because both viewer premises 106 and 108 are serviced by the same service provider 102, the service provider 102 can internally manage billing of the cost of the shared multimedia channel, if any.

FIG. 2 illustrates an example multimedia content distribution system 200 similar to the example multimedia content distribution system 100 of FIG. 1. However, in the depicted example of FIG. 2, the multimedia content distribution system 200 includes viewer premises 206 and viewer premises 208 connected to a service provider 202 via different access networks: access network 204 and access network 205, respectively. The viewer premises 206 includes a residential gateway 212, a multimedia receiver 214, and a display device 216, and the viewer premises 208 includes a residential gateway 218, a multimedia receiver 220, and a display device 222. For purposes of this example, it is assumed that the viewer premises 206 is typically serviced by service provider 202 while viewer premises 208 is typically serviced by another service provider 203, and thus access network 204 is a private or quasi-private network associated with service provider 202 and access network 205 is a private or quasi-private network associated with service provider 203 or is a public network.

As with the multimedia content distribution system 100 of FIG. 1, an initiating viewer at the viewer premises 206 can request sharing of a multimedia channel 224 with a recipient viewer at viewer premises 208 by providing viewer input 226 to the multimedia receiver 214, which in turn generates a channel share request 230 in response to the viewer input and provides the channel share request 230 to the service provider 202. In response to the channel share request 230, the service provider 202 identifies the recipient viewer and determines that the recipient viewer is on a different access network. Because the recipient viewer is on the access network 205, it may not be possible to share the multimedia channel in the same way that a multimedia channel could be shared with a viewer premises on the same access network 204 as described with respect to FIG. 1 due to network boundary issues. Rather, in at least one embodiment, the service provider 202 may need to establish a multimedia communications session 232 or other network connection with the viewer premises 208 before the content of the multimedia channel 224 can be shared with the viewer premises 208. The service provider 202 can establish the multimedia communications session 232 directly with the viewer premises 208 via the access network 205. In an alternate embodiment, the service provider 202 can use the service provider 203 as an intermediary in establishing the multimedia communications session 232. To illustrate, the service provider 202 may seek authorization and authentication to access the access network 205, the viewer premises 208, or both. An example process of using Session Initiation Protocol (SIP) (Internet Engineering Task Force Request for Comments (RFC) 3261) to establish a SIP-based multimedia communications session between the service provider 202 and the viewer premises 208 is described below with respect to FIG. 7. Alternately, the service provider 202 may conduct the provision of the content of the multimedia channel 224 with the viewer premises 208 through the service provider 203, whereby the content is provided to the service provider 203, which when provides the content to the viewer premises 208 via the access network 205.

Figure 3:
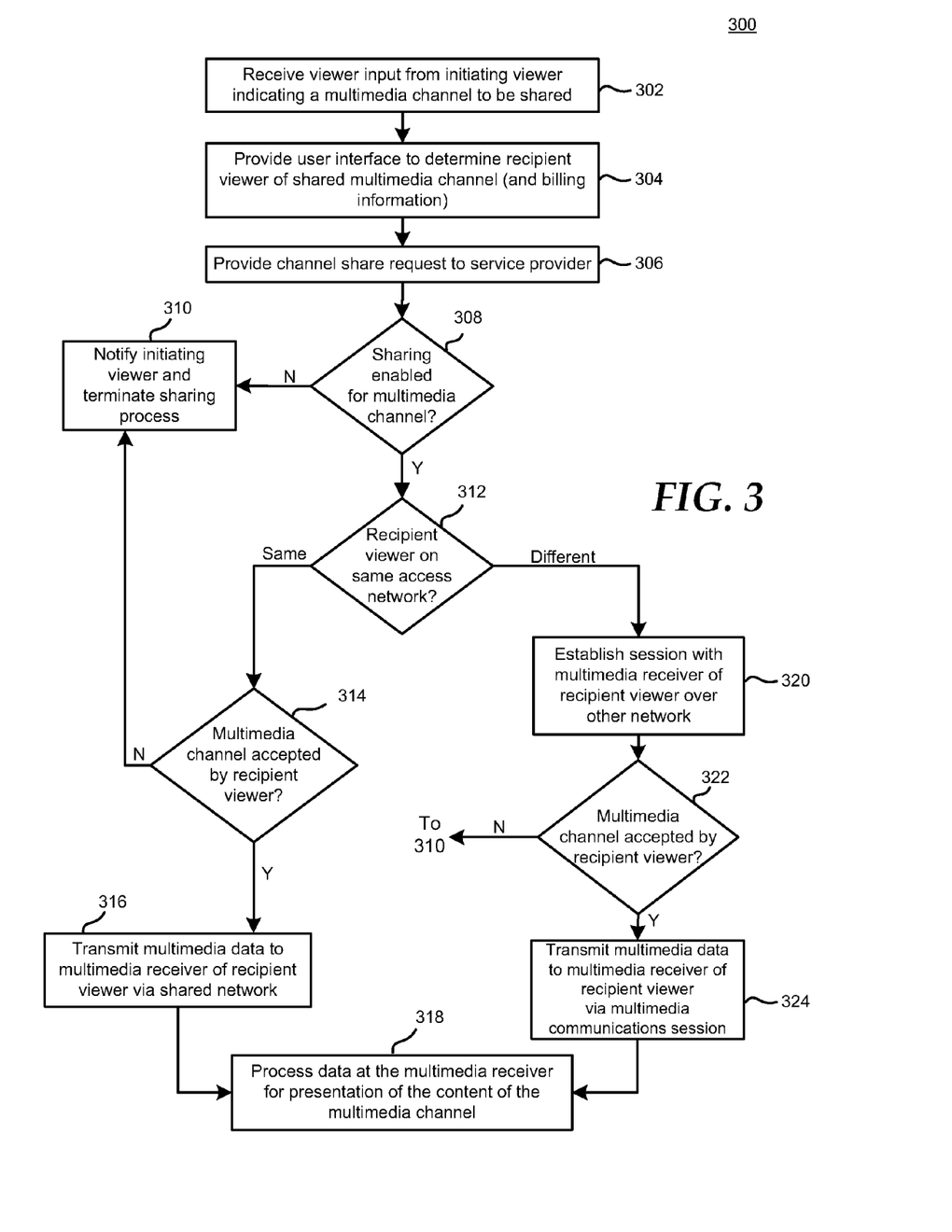
FIG. 3 is a flow diagram illustrating an example method of sharing a multimedia channel with another viewer in accordance with at least one embodiment of the present disclosure.

FIG. 3 illustrates an example method 300 for sharing a multimedia channel in multimedia distribution systems as described in FIGS. 1 and 2 in accordance with at least one embodiment of the present disclosure. The method 300 initiates at block 302, whereby the multimedia receiver of an initiating viewer receives viewer input representative of a request to share a multimedia channel with one or more recipient viewers. The viewer input can include, signaling resulting from a press of a "share" specific button on a remote control device, selection of a "share" feature in a GUI being provided by the multimedia receiver, and the like. The multimedia channel to be shared can include the multimedia channel currently being watched by the initiating viewer, a multimedia channel selected via an EPG or other listing, and the like.

At block 304, the multimedia receiver provides a user interface to the initiating viewer to facilitate the input of identification of the recipient viewer (such as by viewer name, associated network address, etc.), as well as to determine which party is to be responsible for the cost, if any, of the shared multimedia channel (as in the case of sharing a "pay-per-view" program). In one embodiment, the user interface includes a dialog box or other GUI feature of an EPG provided by the multimedia receiver.

At block 306, the multimedia receiver generates a channel share request based on this obtained information and transmits the channel share request to the service provider that is the source of the shared multimedia channel. At block 308, the service provider receives the channel share request, and in response, determines whether sharing is enabled for the indicated multimedia channel, and if enabled, whether the identified multimedia channel can be shared with the particular identified recipient viewer. If sharing is not enabled in general or specifically for the identified recipient viewer, at block 310 the service provider sends a sharing denied message to the multimedia receiver, and in response, the multimedia receiver displays a message indicating that the identified multimedia channel cannot be shared and terminates the channel sharing process. Otherwise, if sharing of the multimedia channel is enabled, at block 312 the service provider determines whether the recipient viewer is on the same network as the initiating viewer or on a different network.

If the recipient viewer is on the same network, at block 314 the service provider queries the recipient viewer to determine whether the recipient viewer will accept or reject the offered multimedia channel. The recipient viewer can, for example, elect to reject the multimedia channel outright, accept the multimedia channel for the purpose of storing the content for later playback, or accept the multimedia channel for immediate playback of its content. If the intended recipient viewer rejects the offered multimedia channel, the method 300 returns to block 310, whereby the service provider precludes transmission of the multimedia data representative of the multimedia channel to the intended recipient viewer and sends a denial message to the multimedia receiver of the initiating viewer, in response to which the multimedia receiver displays a message indicating that the recipient viewer has declined to receive the offered multimedia channel and the multimedia receiver then terminates the channel sharing process. Otherwise, if the recipient viewer accepts the offered multimedia program, at block 316 the service provider begins transmitting the content of the shared multimedia channel to the recipient viewer by, for example, adding the network address of the recipient viewer to the multicast group associated with the shared multimedia channel. Alternately, if the multimedia data of the multimedia channel is already being transmitted to the recipient viewer but the recipient viewer is blocked from access due to scrambling or a passcode mechanism, the service provider can provide the shared multimedia channel to the recipient viewer by, for example, temporarily providing the multimedia receiver of the recipient viewer with the access codes or descrambling keys. At block 318, the multimedia receiver of the recipient viewer processes the received multimedia data representative of the content of the shared multimedia channel for presentation at the recipient viewer premises. For later playback, this processing can include, for example, encoding and storing the data. For immediate playback, this processing can include, for example, descrambling, decompressing, or decoding the data (such as when the data is transmitted as, for example, MPEG or H.264 data) and converting the resulting display data to signaling to control the display device of the recipient viewer premises.

Returning to block 312, if the service provider determines that the recipient viewer is on a different access network, at block 320 the service provider establishes a multimedia communications session with the multimedia receiver of the recipient viewer across the network boundary. As discussed above, this multimedia communications session can be established directly with the multimedia receiver of the recipient viewer using any of a variety of inter-network signaling protocols, including, but not limited to, SIP. Alternately, the multimedia communications session between the service provider and the recipient viewer for purposes of transmitting the data representative of the content of the shared multimedia channel can be conducted via a third party, such as another service provider responsible for the recipient viewer.

After establishing the multimedia communications session, either directly or indirectly, at block 322 the service provider queries the recipient viewer to determine whether the recipient viewer will accept the offered multimedia program, as similarly described above with respect to block 314. In the event that the recipient viewer rejects the offered multimedia channel, the method 300 proceeds to block 310, whereby the service provider precludes transmission of multimedia data representative of the offered multimedia channel to the recipient viewer and notifies the initiating viewer that the intended recipient viewer has declined the offered multimedia channel. Otherwise, if the recipient viewer has accepted the offered multimedia channel, at block 324 the service provider transmits the multimedia data representative of the content of the shared multimedia channel to the recipient viewer via the multimedia communications session established directly between the service provider and the multimedia receiver of the recipient viewer, or via the multimedia communications session established indirectly via another service provider. The multimedia receiver of the recipient viewer then processes the incoming multimedia data at block 318 as described above.

Figure 4:
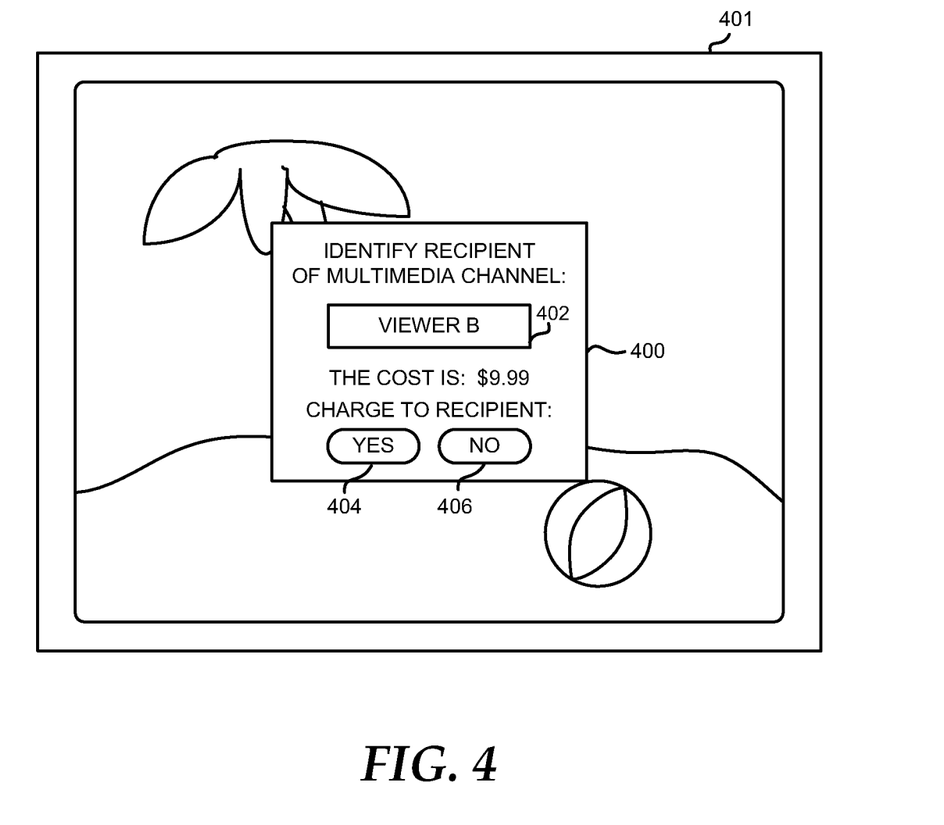
FIG. 4 is a diagram illustrating an example dialog box of a graphical user interface (GUI) for obtaining viewer input regarding a multimedia channel to be shared with a recipient viewer in accordance with at least one embodiment of the present disclosure.

FIG. 4 illustrates an example dialog box 400 utilized by a multimedia receiver (such as multimedia receiver 114 (FIG. 1) or multimedia receiver 214 (FIG. 2)) of an initiating viewer to obtain channel sharing information from the initiating viewer in accordance with at least one embodiment of the present disclosure. The multimedia receiver can provide the dialog box 400 for display at a display device 401 as part of an EPG, OSD, or other GUI in response to receiving viewer input indicating a request to share a multimedia channel. In the depicted example, the dialog box 400 includes a field 402 in which the initiating viewer can identify one or more recipient viewers (such as "VIEWER B"). The field 402 can include a drop-down list from which the recipient viewer can be selected, an entry field in which the recipient viewer can be identified by user ID, network address, and the like, or a combination thereof. As also illustrated, the dialog box 400 can display the cost of sharing the selected multimedia program, and one or more user-selectable features (such as "Yes" button 404 and "No" button 406) that facilitate identification of the party responsible for the identified cost. The dialog box 400 further can include a field to identify the multimedia channel to be shared (not shown). However, in the event that the multimedia channel selected to be shared is the multimedia channel currently being viewed by the initiating viewer or is selected by the initiating viewer from an EPG or other listing prior to the display of the dialog box 400, it may be unnecessary to obtain further input from the viewer to identify the multimedia channel to be shared.

Figure 5:
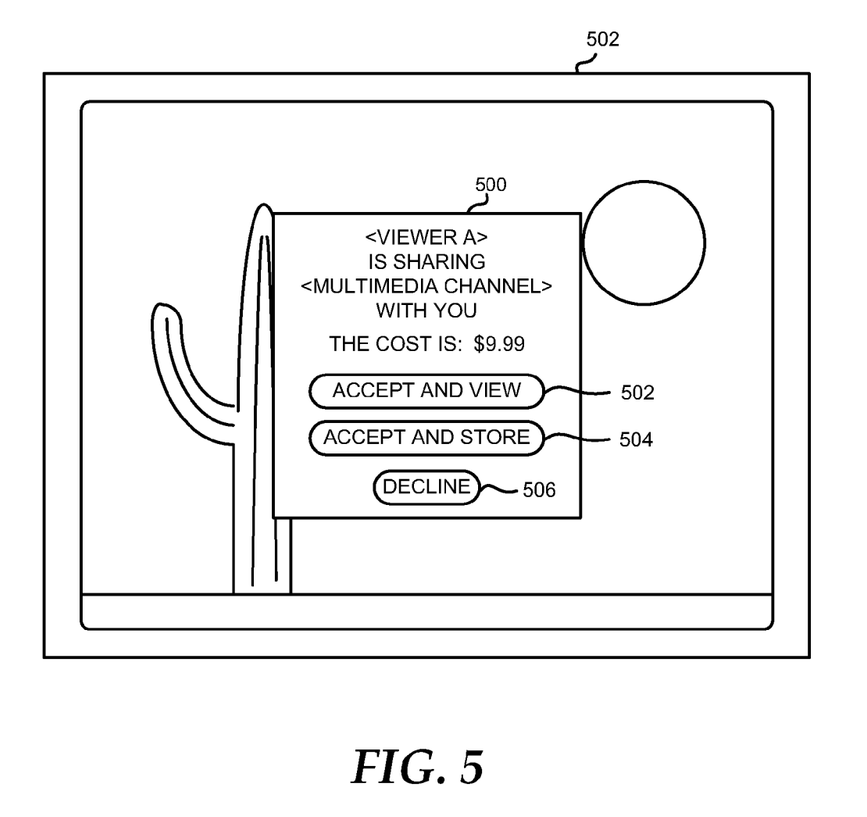
FIG. 5 is a diagram illustrating an example dialog box of a GUI for obtaining viewer input accepting or declining a shared multimedia channel in accordance with at least one embodiment of the present disclosure.

FIG. 5 illustrates an example dialog box 500 utilized by a multimedia receiver (such as multimedia receiver 120 (FIG. 1) or multimedia receiver 220 (FIG. 2)) of an intended recipient viewer to query the intended recipient viewer as to whether the intended recipient viewer wishes to accept or reject the shared multimedia channel in accordance with at least one embodiment of the present disclosure. The multimedia receiver can provide the dialog box 500 for display at a display device 501 as part of an EPG, OSD, or other GUI in response to receiving a query from a service provider regarding the potential sharing of an identified multimedia channel. In the depicted example, the dialog box 500 includes a field identifying the initiating viewer (e.g., "<VIEWER A>" in FIG. 5) and the offered multimedia channel (e.g., "<MULTIMEDIA CHANNEL>" in FIG. 5). The dialog box 500 further can include a field identifying the cost to the recipient viewer should the offered multimedia channel be accepted, and one or more user-selectable features (e.g., "Accept and View" button 502, "Accept and Store" button 504, and "Decline" button 506) that allow the recipient viewer to select the desired option for the offered multimedia program (accept and store for later playback, accept for immediate playback, or reject).

Figure 6:
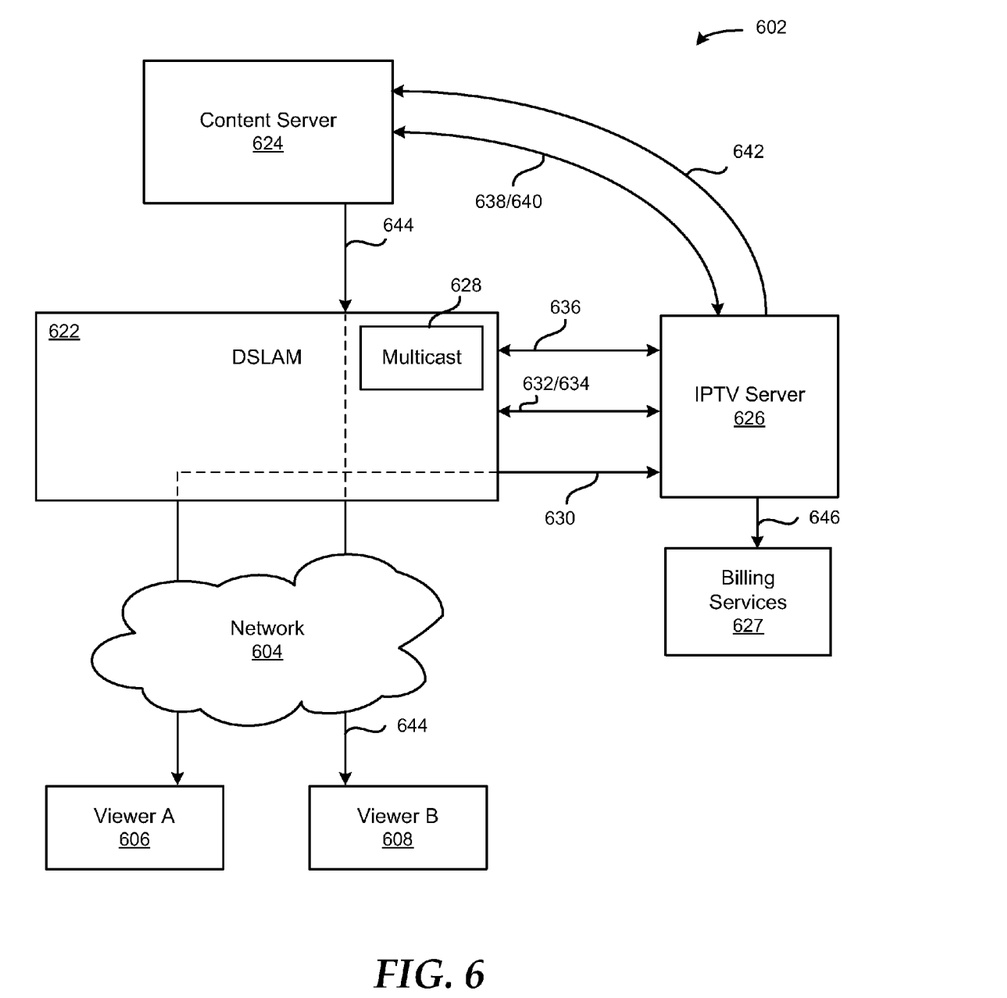
FIG. 6 is a diagram illustrating an example digital subscriber line (DSL)-based service provider in accordance with at least one embodiment of the present disclosure.

FIG. 6 illustrates a particular implementation of a service provider 602 in the context of a DSL access network 604 (such as a POTS network) shared by viewer premises 606 and 608 in accordance with at least one embodiment of the present disclosure. In the depicted example, the service provider 602 includes a digital subscriber line access multiplexer (DSLAM) 622, a content server 624, an IPTV notification server 626, and a billing services database 627. The DSLAM 622 interfaces with the residential gateways of the viewer premises 606 and 608 via the DSL network 608. In one embodiment, the provision of multimedia channels to multiple viewers is handled by the DSLAM 622 via multicasting techniques, whereby a multicast controller 628 of the DSLAM 622 maintains a database of the multicast groups associated with corresponding multimedia channels and the addresses of devices at viewers premises associated with each multicast group. The content server 624 includes one or more servers for providing the content of multimedia channels to viewers' premises as multimedia data streams representative of the multimedia channels. For a given multimedia channel, the content server 624 generates the corresponding multimedia data stream and provides the multimedia data stream to the DSLAM 622, which then multicasts the data stream to one or more viewers premises via the DSL network 608 based on membership in the multicast address associated with the multimedia channel. The IPTV notification server 626 is configured to provide various notifications to viewer premises regarding operation and provision of services to the viewer. To illustrate, in addition to providing notification regarding the availability of sharing of multimedia channels, the IPTV notification server 626 can provide information regarding incoming telephone calls (such as the caller ID and telephone number) that are communicated to the viewer's premises by the service provider 102 via the network connection.

In order to request sharing of an identified multimedia channel, viewer A at viewer premises 606 initiates the transmission of a channel share request 630 to the DSLAM 622 via the DSL network 604. The DSLAM 622, in turn, forwards the channel share request 630 to the IPTV notification server 626. The IPTV notification server 626 processes the channel share request 630 and provides a servicing query 632 to the DSLAM 622 to determine whether the DSLAM 622 is currently servicing the identified multimedia channel. The DSLAM 622 provides a servicing response 634 indicating whether the identified multimedia channel is currently being processed by the DSLAM 622. If the multimedia channel is currently being processed, the IPTV notification server 626 provides an add CPE signal 636 to direct the DSLAM 622 to cross-connect the multimedia data 644 of the identified multimedia channel to the residential gateway of the viewer premises 608 by, for example, directing the multicast controller 628 to add the network address of the residential gateway to the multicast group associated with the multimedia channel via an IGMP request.

Otherwise, if the servicing response 634 indicates that the DSLAM 622 is not currently servicing the multimedia channel, the IPTV notification server 626 provides a servicing query 638 to the content server 624 to determine whether the content server 624 is capable of servicing the multimedia channel. The content server 624 responds with a servicing response 640 identifying whether the content server 624 is capable of servicing the multimedia channel. If the content server 624 is not capable of servicing the multimedia channel, the IPTV notification server 626 sends a denial notification (not shown) to the viewer premises 606 via the DSLAM 622 and the DSL network 604. If the content server 624 is capable of servicing the multimedia channel, the IPTV notification server 626 provides an add CPE message 642 to direct the content server 624 to cross connect the multimedia data 644 of the identified multimedia channel to the residential gateway of the viewer premises 608 via, for example, an IGMP multicast group addition.

Upon confirmation that the viewer premises 608 is being provided with the multimedia data 644 of the shared multimedia channel, the IPTV server 626 provides a billing notification 646 to the billing services database 627 so as to initiate billing to the viewer identified as responsible for any costs associated with the shared multimedia channel.

Figure 7:
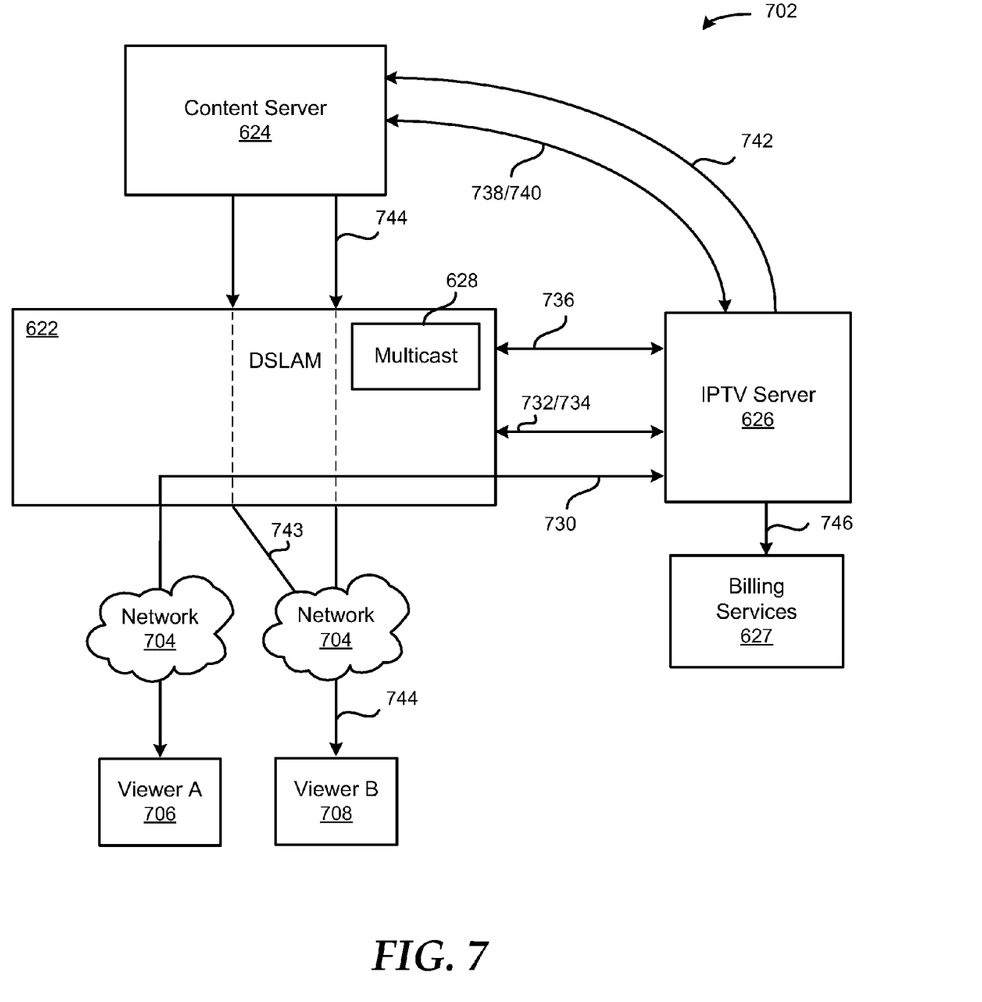
FIG. 7 is a diagram illustrating another example digital subscriber line (DSL)-based service provider in accordance with at least one embodiment of the present disclosure.

FIG. 7 illustrates an alternate implementation of a service provider 702 of FIG. 6 in the context of different access networks 704 and 705 used by viewer premises 706 and 708, respectively, in accordance with at least one embodiment of the present disclosure. For ease of illustration, the networks 704 and 705 are described as DSL-based access networks.

In order to request sharing of an identified multimedia channel, viewer A at viewer premises 706 initiates the transmission of a channel share request 730 to the DSLAM 622 via the DSL network 704. The DSLAM 622, in turn, forwards the channel share request 730 to the IPTV notification server 626. The IPTV notification server 626 processes the channel share request 730 and provides a servicing query 732 to the DSLAM 622 to determine whether the DSLAM 622 is currently servicing the identified multimedia channel. The DSLAM 622 provides a servicing response 734 indicating whether the identified multimedia channel is currently being processed by the DSLAM 622. If the multimedia channel is currently being processed, the IPTV notification server 626 provides an add CPE signal 736 to direct the DSLAM 622 to cross-connect the multimedia data 744 of the identified multimedia channel to the residential gateway of the viewer premises 708. However, because the viewer premises 708 is on a different access network 705, the DSLAM 622 first establishes a multimedia communications session 743 with the residential gateway or multimedia receiver of the viewer premises 708. In one embodiment, the SIP protocol is utilized to initiate the multimedia communications session using, e.g., a SIP INVITE message and the resulting session acknowledgement process.

Otherwise, if the servicing response 734 indicates that the DSLAM 622 is not currently servicing the multimedia channel, the IPTV notification server 626 provides a servicing query 738 to the content server 624 to determine whether the content server 624 is capable of servicing the multimedia channel. The content server 624 responds with a servicing response 740 identifying whether the content server 624 is capable of servicing the multimedia channel. If the content server 624 is not capable of servicing the multimedia channel, the IPTV notification server 626 sends a denial notification (not shown) to the viewer premises 706 via the DSLAM 622 and the access network 704. If the content server 624 is capable of servicing the multimedia channel, the IPTV notification server provides an add CPE message 742 to direct the content server 624 to cross connect the multimedia data 644 of the identified multimedia channel to the residential gateway of the viewer premises 708 by, for example, establishing the SIP-based multimedia communications session 743 described above.

Upon confirmation that the viewer premises 608 is being provided with the multimedia data 744 of the shared multimedia channel, the IPTV server 626 provides a billing notification 746 to the billing services database 627 so as to initiate billing to the viewer identified as responsible for any costs associated with the shared multimedia channel. In the event that the recipient viewer is responsible for the cost, the service provider 702 can bill the recipient viewer directly, if appropriate, or the service provider 702 may have an agreement with another service provider associated with the recipient viewer whereby the other service provider bills the recipient viewer and then reimburses the service provider 702.

Figure 8:
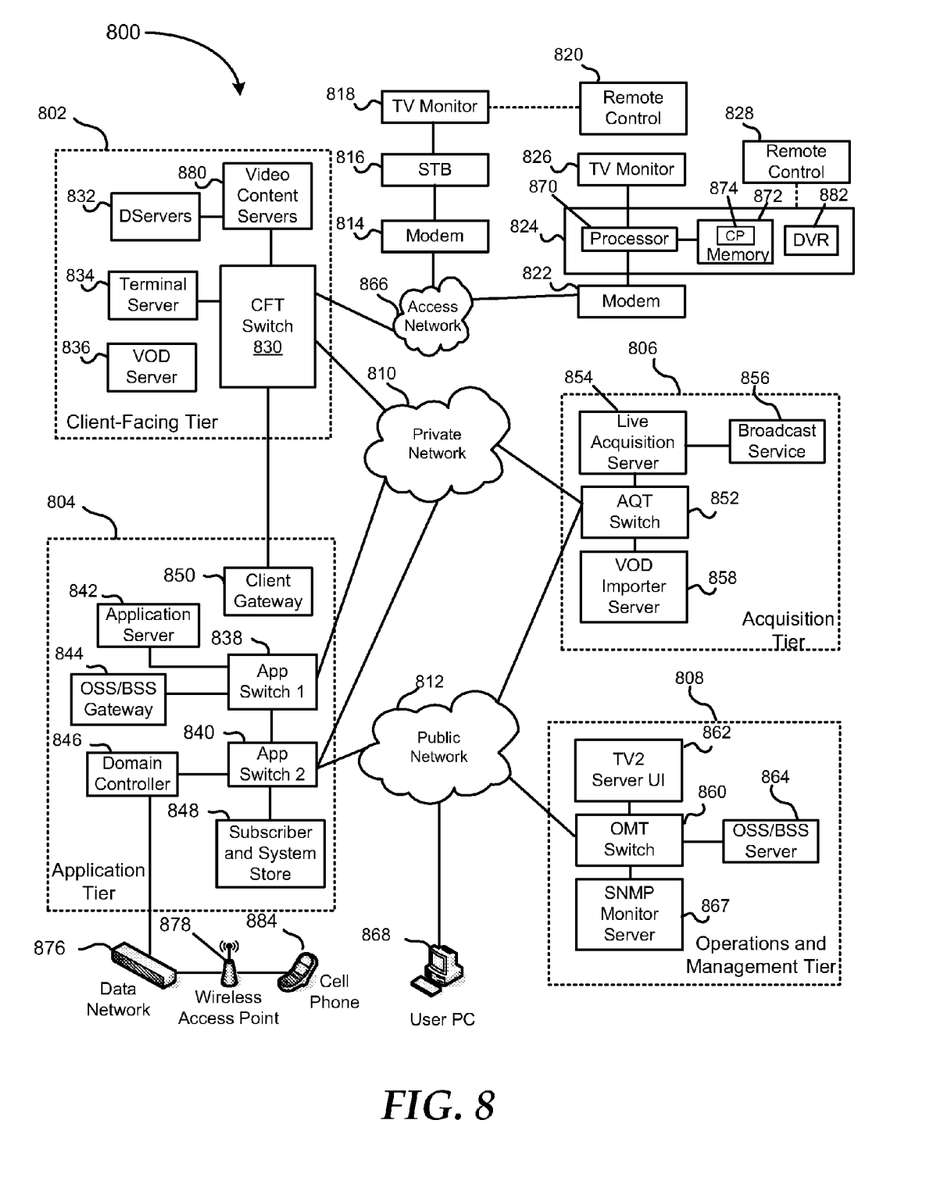
FIG. 8 is a diagram illustrating an example Internet Protocol Television (IPTV) network in which the multimedia content distribution systems of FIGS. 1 and 2 can be implemented in accordance with at least one embodiment of the present disclosure.

FIG. 8 illustrates an IPTV system 800 in which the above-illustrated multimedia content distribution systems can be implemented in accordance with at least one embodiment of the present disclosure. The IPTV system 800 includes a client facing tier 802, an application tier 804, an acquisition tier 806, and an operations and management tier 808. Each tier 802, 804, 806, and 808 is coupled to one or both of a private network 810 and a public network 812. For example, the client-facing tier 802 can be coupled to the private network 810, while the application tier 804 can be coupled to the private network 810 and to the public network 812 such as the Internet. The acquisition tier 806 can also be coupled to the private network 810 and to the public network 812. Moreover, the operations and management tier 808 can be coupled to the public network 812.

The various tiers 802, 804, 806, and 808 communicate with each other via the private network 810 and the public network 812. For instance, the client-facing tier 802 can communicate with the application tier 804 and the acquisition tier 806 via the private network 810. The application tier 804 can also communicate with the acquisition tier 806 via the private network 810. Further, the application tier 804 can communicate with the acquisition tier 806 and the operations and management tier 808 via the public network 812. Moreover, the acquisition tier 806 can communicate with the operations and management tier 808 via the public network 812. In a particular embodiment, elements of the application tier 804 can communicate directly with the client-facing tier 802.

The client-facing tier 802 can communicate with user equipment via a private access network 866, such as an IPTV network. In an illustrative embodiment, modems such as a first modem 814 and a second modem 822 can be coupled to the private access network 866. The client-facing tier 802 can communicate with a first representative STB device 816 via the first modem 814 and with a second representative STB device 824 via the second modem 822. The STB devices 816 and 824 represent implementations of the multimedia receiver 102 of FIG. 1 or the multimedia receiver 902 of FIG. 9. The client-facing tier 802 can communicate with a large number of set-top boxes over a wide geographic area, such as a regional area, a metropolitan area, a viewing area, or any other suitable geographic area that can be supported by networking the client-facing tier 802 to numerous set-top box devices. In one embodiment, the client-facing tier 802 can be coupled to the modems 814 and 822 via fiber optic cables. Alternatively, the modems 814 and 822 can be DSL modems that are coupled to one or more network nodes via twisted pairs, and the client-facing tier 802 can be coupled to the network nodes via fiber-optic cables. Each set-top box device 816 and 824 can process data received from the private access network 866 via an IPTV software platform such as Microsoft® TV IPTV Edition.

The first set-top box device 816 can be coupled to a first display device 818, such as a first television monitor, and the second set-top box device 824 can be coupled to a second display device 826, such as a second television monitor. Moreover, the first set-top box device 816 can communicate with a first remote control 820, and the second set-top box device can communicate with a second remote control 828. In an exemplary, non-limiting embodiment, each set-top box device 816 and 824 can receive data or video from the client-facing tier 802 via the private access network 866 and render or display the data or video at the display device 818 or 826 to which it is coupled. The set-top box devices 816 and 824 thus may include tuners that receive and decode television programming information for transmission to the display devices 818 and 826. Further, the set-top box devices 816 and 824 can include an STB processor 870 and an STB memory device 872 that is accessible to the STB processor. In a particular embodiment, the set-top box devices 816 and 824 can also communicate commands received from the remote controls 820 and 828 back to the client-facing tier 802 via the private access network 866.

In an illustrative embodiment, the client-facing tier 802 can include a client-facing tier (CFT) switch 830 that manages communication between the client-facing tier 802 and the private access network 866 and between the client-facing tier 802 and the private network 810. As shown, the CFT switch 830 is coupled to one or more data servers 832 that store data transmitted in response to user requests, such as video-on-demand material. The CFT switch 830 can also be coupled to a terminal server 834 that provides terminal devices, such as a game application server and other devices with a common connection point to the private network 810. In a particular embodiment, the CFT switch 830 can also be coupled to a video-on-demand (VOD) server 836.

The application tier 804 can communicate with both the private network 810 and the public network 812. In this embodiment, the application tier 804 can include a first application tier (APP) switch 838 and a second APP switch 840. In a particular embodiment, the first APP switch 838 can be coupled to the second APP switch 840. The first APP switch 838 can be coupled to an application server 842 and to an OSS/BSS gateway 844. The application server 842 provides applications to the set-top box devices 816 and 824 via the private access network 866, so the set-top box devices 816 and 824 can provide functions such as display, messaging, processing of IPTV data and VOD material. In a particular embodiment, the OSS/BSS gateway 844 includes operation systems and support (OSS) data, as well as billing systems and support (BSS) data.

The second APP switch 840 can be coupled to a domain controller 846 that provides web access, for example, to users via the public network 812. The second APP switch 840 can be coupled to a subscriber and system store 848 that includes account information, such as account information that is associated with users who access the system 800 via the private network 810 or the public network 812. In a particular embodiment, the application tier 804 can also include a client gateway 850 that communicates data directly to the client-facing tier 802. In this embodiment, the client gateway 850 can be coupled directly to the CFT switch 830. The client gateway 850 can provide user access to the private network 810 and the tiers coupled thereto.

In a particular embodiment, the set-top box devices 816 and 824 can access the system via the private access network 866 using information received from the client gateway 850. The private access network 866 provides security for the private network 810. User devices can access the client gateway 850 via the private access network 866, and the client gateway 850 can allow such devices to access the private network 810 once the devices are authenticated or verified. Similarly, the client gateway 850 can prevent unauthorized devices, such as hacker computers or stolen set-top box devices, from accessing the private network 810 by denying access to these devices beyond the private access network 866.

For example, when the set-top box device 816 accesses the system 800 via the private access network 866, the client gateway 850 can verify subscriber information by communicating with the subscriber and system store 848 via the private network 810, the first APP switch 838 and the second APP switch 840. Further, the client gateway 850 can verity billing information and status by communicating with the OSS/BSS gateway 844 via the private network 810 and the first APP switch 838. The OSS/BSS gateway 844 can transmit a query across the first APP switch 838, to the second APP switch 840, and the second APP switch 840 can communicate the query across the public network 812 to the OSS/BSS server 864. After the client gateway 850 confirms subscriber and/or billing information, the client gateway 850 can allow the set-top box device 816 access to IPTV content and VOD content. If the client gateway 850 cannot verity subscriber information for the set-top box device 816, such as because it is connected to a different twisted pair, the client gateway 850 can deny transmissions to and from the set-top box device 816 beyond the private access network 866.

The acquisition tier 806 includes an acquisition tier (AQT) switch 852 that communicates with the private network 810. The AQT switch 852 can also communicate with the operations and management tier 808 via the public network 812. In a particular embodiment, the AQT switch 852 can be coupled to a live acquisition server 854 that receives television content, for example, from a broadcast service 856. Further, the AQT switch can be coupled to a video-on-demand importer server 858 that stores television content received at the acquisition tier 806 and communicate the stored content to the client-facing tier 802 via the private network 810.

The operations and management tier 808 can include an operations and management tier (OMT) switch 860 that conducts communication between the operations and management tier 808 and the public network 812. In the illustrated embodiment, the OMT switch 860 is coupled to a TV2 server 862. Additionally, the OMT switch 860 can be coupled to an OSS/BSS server 864 and to a simple network management protocol (SNMP) monitor 867 that monitors network devices. In a particular embodiment, the OMT switch 860 can communicate with the AQT switch 852 via the public network 812.

In a particular embodiment during operation of the IPTV system, the live acquisition server 854 can acquire television content from the broadcast service 856. The live acquisition server 854 in turn can transmit the television content to the AQT switch 852 and the AQT switch can transmit the television content to the CFT switch 830 via the private network 810. Further, the television content can be encoded at the D-servers 832, and the CFT switch 830 can communicate the television content to the modems 814 and 822 via the private access network 866. The set-top box devices 816 and 824 can receive the television content from the modems 814 and 822, decode the television content, and transmit the content to the display devices 818 and 826 according to commands from the remote control devices 820 and 828.

Additionally, at the acquisition tier 806, the VOD importer server 858 can receive content from one or more VOD sources outside the IPTV system 800, such as movie studios and programmers of non-live content. The VOD importer server 858 can transmit the VOD content to the AQT switch 852, and the AQT switch 852 in turn can communicate the material to the CFT switch 830 via the private network 810. The VOD content can be stored at one or more servers, such as the VOD server 836.

When a user issues a request for VOD content to the set-top box device 816 or 824, the request can be transmitted over the private access network 866 to the VOD server 836 via the CFT switch 830. Upon receiving such a request, the VOD server 836 can retrieve requested VOD content and transmit the content to the set-top box device 816 or 824 across the private access network 866 via the CFT switch 830. In an illustrative embodiment, the live acquisition server 854 can transmit the television content to the AQT switch 852, and the AQT switch 852 in turn can transmit the television content to the OMT switch 860 via the public network 812. In this embodiment, the OMT switch 860 can transmit the television content to the TV2 server 862 for display to users accessing the user interface at the TV2 server. For example, a user can access the TV2 server 862 using a personal computer (PC) 868 coupled to the public network 812.

The domain controller 846 communicates with the public network 812 via the second APP switch 840. Additionally, the domain controller 846 can communicate via the public network 812 with the PC 868. For example, the domain controller 846 can display a web portal via the public network 812 and allow users to access the web portal using the PC 868. Further, in an illustrative embodiment, the domain controller 846 can communicate with at least one wireless network access point 878 over a data network 876. In this embodiment, each wireless network access device 878 can communicate with user wireless devices such as a cellular telephone 884.

In a particular embodiment, the set-top box devices can include an STB computer program 874 that is embedded within the STB memory device 872. The STB computer program 874 can contain instructions to receive and execute at least one user television viewing preference that a user has entered by accessing an Internet user account via the domain controller 846. For example, the user can use the PC 868 to access a web portal maintained by the domain controller 846 via the Internet. The domain controller 846 can query the subscriber and system store 848 via the private network 810 for account information associated with the user. In a particular embodiment, the account information can associate the user's Internet account with the second set-top box device 824. For instance, in an illustrative embodiment, the account information can relate the user's account to the second set-top box device 824 by associating the user account with an IP address of the second set-top box device, with data relating to one or more twisted pairs connected with the second set-top box device, with data related to one or more fiber optic cables connected with the second set-top box device, with an alpha-numeric identifier of the second set-top box device, with any other data that is suitable for associating the second set-top box device with a user account, or with any combination of these.

The STB computer program 874 can contain instructions to receive many types of user preferences from the domain controller 846 via the access network 866. For example, the STB computer program 874 can include instructions to receive a request to record at least one television program at a video content storage module such as a digital video recorder (DVR) 882 within the second set-top box device 824. In this example embodiment, the STB computer program 874 can include instructions to transmit the request to the DVR 882, where the television program(s) are recorded. In an illustrative embodiment, the STB computer program 874 can include instructions to receive from the DVR 882 a recording status with respect to one or more of the television programs and to transmit at least one message regarding the status to a wireless device, such as the cellular telephone 884. The message can be received at the CFT switch 830, for instance, and communicated to the domain controller 846 across the private network 810 via the second APP switch 840. Further, the domain controller 846 can transmit the message to the wireless data network 876, directly or via the public network 812, and on to the wireless network access point 878. The message can then be transmitted to the cellular telephone 884. In an illustrative embodiment, the status can be sent via a wireless access protocol (WAP).

Figure 9:
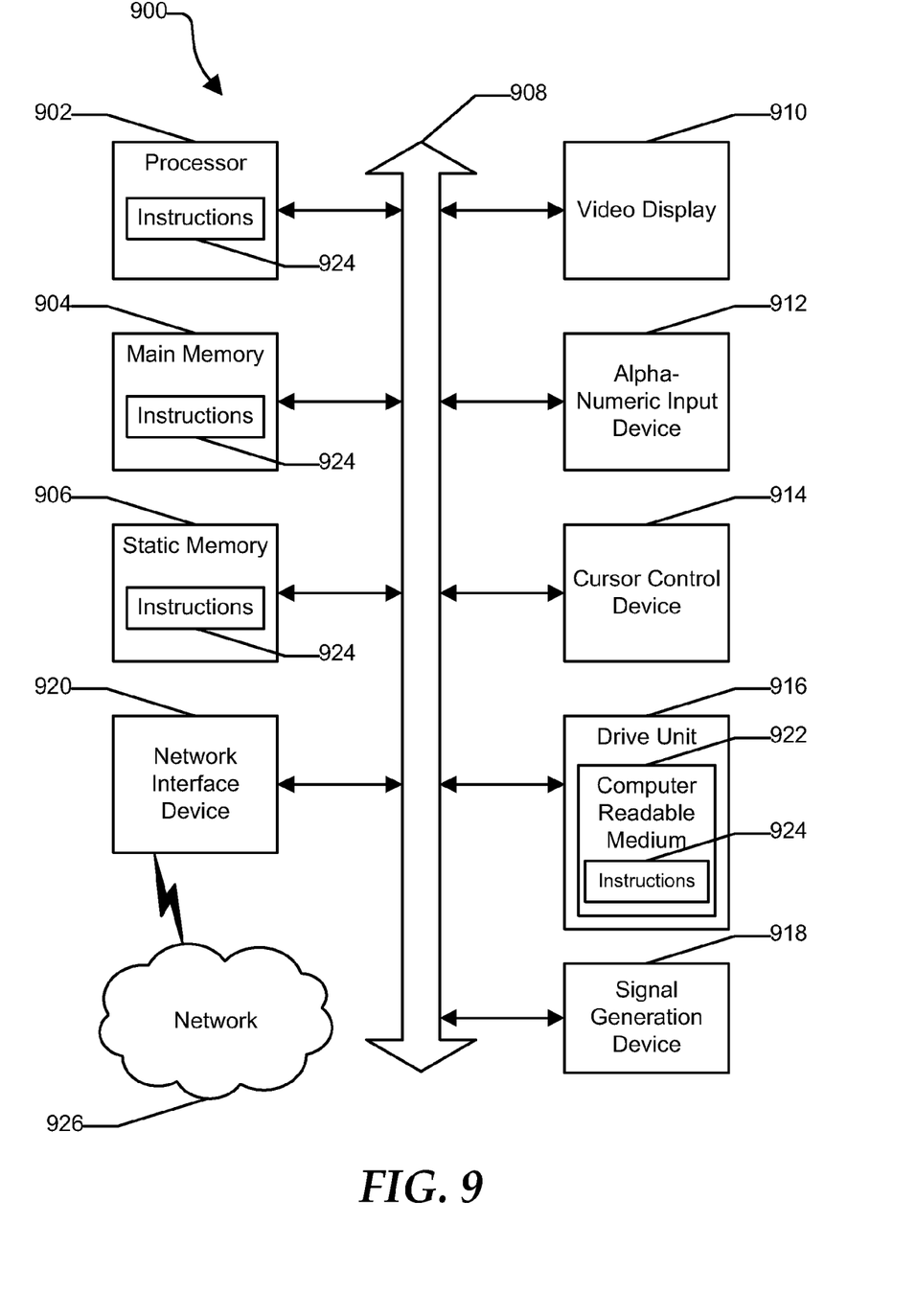
FIG. 9 is a diagram illustrating an example computer system for implementing one or more of the techniques described herein in accordance with at least one embodiment of the present disclosure.

FIG. 9 shows an illustrative embodiment of a general computer system 900 in accordance with at least one embodiment of the present disclosure. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. The computer system 900 can represent, for example, an implementation of a multimedia receiver or at least part of a service provider, as described above.

In a networked deployment, the computer system may operate in the capacity of a server or as a client user computer in a server-client user network environment, or as a peer computer system in a peer-to-peer (or distributed) network environment. The computer system 900 can also be implemented as or incorporated into, for example, a STB device. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 includes one or more processors 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, SIP, IGMP) represent examples of the state of the art. Such standards are periodically superseded by faster or more efficient equivalents having essentially the same functions. Accordingly, replacement standards and protocols having the same or similar functions as those disclosed herein are considered equivalents thereof.

What is claimed is:

1. A multimedia receiver device, comprising:
a memory storing computer instructions; and
a processor coupled to the memory, wherein the processor, responsive to executing the computer instructions, performs operations comprising:
receiving at the multimedia receiver device a first request to share with a second multimedia receiver device a first multimedia content channel sourced to the multimedia receiver device from a service provider server;
determining whether the first multimedia content channel is available to the second multimedia receiver device from a network element that is communicatively coupled to the second multimedia receiver device responsive to the first request; and
sending a second request to the service provider server to provision a multimedia data stream representative of the first multimedia content channel to be directed to the second multimedia receiver device responsive to the determination that the first multimedia content channel is not available at the network element.

2. The multimedia receiver device of claim 1, wherein the service provider server forwards the multimedia data stream to the second multimedia receiver device by way of a first multimedia content channel multicast group originating from the network element.

3. The multimedia receiver device of claim 1, wherein the processor, responsive to executing the computer instructions, performs operations comprising presenting a graphical user interface for displaying the first request.

4. The multimedia receiver device of claim 3, wherein the processor, responsive to executing the computer instructions, performs operations comprising displaying, via the graphical user interface, a cost associated with sharing the first multimedia content channel with the second multimedia receiver device.

5. The multimedia receiver device of claim 3, wherein the processor, responsive to executing the computer instructions, performs operations comprising receiving, via the graphical user interface, an indication whether a cost associated with sharing the first multimedia content channel with the second multimedia receiver device will be charged to the multimedia receiver device or to the second multimedia receiver device.

6. The multimedia receiver device of claim 1, wherein the first request comprises one of a user identification associated with a second viewer associated with the second multimedia receiver device or a network address associated with the second multimedia receiver.

7. The multimedia receiver device of claim 1, wherein the multimedia receiver device is communicatively coupled to the service provider server by way of a first access network and the second multimedia receiver device is communicatively coupled to the service provider server by way of a second access network and wherein the processor, responsive to executing the computer instructions, performs operations comprising establishing a multimedia communications session between the second multimedia receiver device and the service provider server by way of signaling based on session initiation protocol.

8. The multimedia receiver device of claim 1, wherein the multimedia data stream is transmitted by the service provider server responsive to an indication that a second viewer associated with the second multimedia receiver device accepts the sharing of the first multimedia content channel.

9. A computer-readable non-transitory storage medium, comprising computer instructions which, responsive to being executed by a processor, cause the processor to perform operations comprising:
transmitting from a first service provider server a first multimedia content channel to a first multimedia receiver device;
receiving at the first service provider server a first request from the first multimedia receiver device to share the first multimedia content channel with a second multimedia receiver device;
determining that the second multimedia receiver device is communicatively coupled to a second service provider server responsive to the first request; and
sending from the first service provider server a second request to the second service provider server to provision a multimedia data stream representative of the first multimedia content channel to the second multimedia receiver device responsive to the determination that the second multimedia receive device is communicatively coupled to the second service provider server.

10. The computer-readable storage medium of claim 9, wherein the second service provider server transmits the multimedia data stream to the second multimedia device by way of a first multimedia content channel multicast group originating from a network element communicatively coupled to the second multimedia receiver device.

11. The computer-readable storage medium of claim 9, wherein the first multimedia receiver device presents a graphical user interface for presenting an indication of the first request responsive to receiving user input initiated by a first viewer associated with the first multimedia receiver device.

12. The computer-readable storage medium of claim 11, wherein the graphical user interface presents information descriptive of a cost associated with sharing the first multimedia content channel with a second viewer.

13. The computer-readable storage medium of claim 11, wherein the graphical user interface presents an indication whether a cost associated with sharing the first multimedia content channel with the second multimedia receiver device will be charged to the multimedia receiver device or to the second multimedia receiver device.

14. The computer-readable storage medium of claim 9, wherein the first request comprises at least one of a user identification associated with the second multimedia receiver device or a network address associated with the second multimedia receiver device.

15. The computer-readable storage medium of claim 9, wherein the multimedia data stream is transmitted by the second service provider server responsive to an indication that the second multimedia receiver device has accepted the sharing of the first multimedia content channel.

16. A server device, comprising:
a memory storing computer instructions; and
a processor coupled to the memory, wherein the processor, responsive to executing the computer instructions, performs operations comprising:

transmitting a first multimedia content channel to a first multimedia receiver device;

receiving a first request from the first multimedia receiver device to share the first multimedia content channel with a second multimedia receiver device;

determining whether the second multimedia receiver device is included in a first multimedia content channel multicast group originating from the server device responsive to the first request;

adding the second multimedia receiver device to the first multimedia content channel multicast group responsive to the determination that the second multimedia receiver device is not included in the first multimedia content channel multicast group; and transmitting a multimedia data stream to the second multimedia receiver device by way of the first multimedia content channel multicast group.

17. The server device of claim 16, wherein the first multimedia receiver device presents a graphical user interface for presenting an indication of the first request responsive to receiving user input initiated by a first viewer associated with the first multimedia receiver device.

18. The server device of claim 17, wherein the graphical user interface comprises an electronic programming guide.

19. The server device of claim 17, wherein the first request comprises one of a user identification associated with a second viewer associated with the second multimedia receiver device or a network address associated with the second multimedia receiver.

20. The server device of claim 16, wherein the multimedia data stream is transmitted responsive to an indication that a second viewer associated with the second multimedia receiver device has accepted the sharing of the first multimedia content channel.

* * * * *